US006642656B2

United States Patent
Kurashina et al.

(10) Patent No.: US 6,642,656 B2
(45) Date of Patent: Nov. 4, 2003

(54) CORROSION-RESISTANT ALUMINA MEMBER AND ARC TUBE FOR HIGH-INTENSITY DISCHARGE LAMP

(75) Inventors: Mitsuru Kurashina, Nagoya (JP); Michio Asai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 41 days.

(21) Appl. No.: 09/818,978

(22) Filed: Mar. 27, 2001

(65) Prior Publication Data

US 2002/0017867 A1 Feb. 14, 2002

(30) Foreign Application Priority Data

Mar. 28, 2000 (WO) ............... PCT/JP00/01906
Jan. 17, 2001 (JP) ....................... 2001-009547

(51) Int. Cl.$^7$ ............... H01J 19/00; C04B 35/00; C04B 35/101; B32B 1/00
(52) U.S. Cl. ............... 313/636; 313/634; 501/127; 501/153; 220/2.1 R; 220/2.3 A; 428/409; 423/625
(58) Field of Search ............... 313/636, 634, 313/493; 220/2, 2.1 R, 2.3 R, 2.3 H, 2.2; 501/127, 153; 428/409; 423/625

(56) References Cited

U.S. PATENT DOCUMENTS

| | | | | |
|---|---|---|---|---|
| 3,620,832 A | * | 11/1971 | Te Velde | 117/210 |
| 3,652,378 A | * | 3/1972 | Mistler | 161/82 |
| 3,837,882 A | * | 9/1974 | Swinehart et al. | 117/16 |
| 3,875,277 A | | 4/1975 | Bratton et al. | |
| 3,935,495 A | | 1/1976 | Scott, Jr. et al. | |
| 4,079,167 A | * | 3/1978 | Scott, Jr. et al. | 428/409 |
| 4,182,972 A | * | 1/1980 | Kaneno et al. | 313/221 |
| 4,184,885 A | * | 1/1980 | Pasco et al. | 106/73.4 |
| 4,222,978 A | | 9/1980 | Oda et al. | |
| 4,396,595 A | * | 8/1983 | Heytmejier et al. | 423/625 |
| 4,495,116 A | * | 1/1985 | Kaneno et al. | 264/1.2 |
| 4,620,131 A | * | 10/1986 | Prud'homme van Reine | 313/636 |
| 4,633,137 A | * | 12/1986 | Scott et al. | 313/636 |
| 4,736,136 A | * | 4/1988 | Persiani et al. | 313/635 |
| 5,077,105 A | * | 12/1991 | Frankfurter et al. | 428/34.6 |
| 5,185,302 A | * | 2/1993 | Luszcz et al. | 501/127 |
| 5,431,704 A | * | 7/1995 | Tamamaki et al. | 501/309 |
| 5,541,145 A | * | 7/1996 | Harris et al. | 501/96 |
| 5,592,048 A | * | 1/1997 | Wei et al. | 313/570 |
| 5,780,377 A | * | 7/1998 | Wajima et al. | 501/152 |
| 5,844,350 A | * | 12/1998 | Scott et al. | 313/25 |
| 5,928,979 A | * | 7/1999 | Inuzuka et al. | 501/120 |
| 6,093,366 A | * | 7/2000 | Kato et al. | 264/681 |
| 6,326,076 B1 | * | 12/2001 | Takai | 428/312.6 |

* cited by examiner

Primary Examiner—David Martin
Assistant Examiner—Dameon E. Levi
(74) Attorney, Agent, or Firm—Burr & Brown

(57) ABSTRACT

An arc tube is formed by polycrystalline alumina so that an average crystal grain diameter of a surface is two to ten times as large as an average crystal grain diameter of an inside including a center line of a thickness and the average crystal grain diameter on the center portion of the thickness is 10 $\mu$m to 100 $\mu$m. As a result, in the arc tube, the total transmittance is 98%, and a linear ray transmittance is 5%.

5 Claims, 3 Drawing Sheets

CORROSION-RESISTANT ALUMINA MEMBER AND ARC TUBE FOR HIGH-INTENSITY DISCHARGE LAMP

BACKGROUND OF THE INVENTION

1. Field of the Invention

This invention relates to a corrosion-resistant/pressure-resistant member made of polycrystalline alumina and an arc tube to be used for a high intensity discharge lamp.

2. Description of the Related Art

Metal halide with high luminous efficacy and excellent color rendering is sealed as a luminous substance into high intensity discharge lamps such as mercury lamps or high-pressure sodium lamps. Since this metal halide is vaporized in arc tubes to have high pressure and strong corrosiveness, arc tubes which are made of polycrystalline alumina with excellent pressure resistance and corrosion resistance are widely used.

However, a grain boundary is easily attacked by a corrosive substance, and as the crystal grains are smaller, the grain boundary increases, namely, the corrosion resistance is occasionally deteriorated. Meanwhile, from a viewpoint of the strength, since the grain boundary becomes a kind of a joint portion, as a number of the boundaries is larger, namely, the crystal grains are smaller, the strength is improved. For this reason, the grains should be small in order to obtain sufficient strength, and the grains should be large in order to obtain corrosion resistance. Therefore, it is difficult that they are compatible.

In addition, since alumina members have excellent corrosion resistance, they are widely used for chemical-resistant containers or appliances which are resistant to chemicals such as acid, but such use in portions which require the chemical resistance and strength is limited due to the above reason.

Further, in the case of the arc tube made of polycrystalline alumina, the total transmittance is 95% and the In-line transmittance is about 3%. In the case where a quartz glass is used, since its total transmittance is low (in comparison with 100%), a post-process which heightens the transmittance is executed in such a manner that surface of the arc tube is polished by mechanical polishing and chemical polishing after calcining so as to be smoothed. As a result, the total transmittance becomes 98% and the In-line transmittance becomes 20%, for example.

The alumina composing the arc tube is formed so that alumina crystals with a normal average grain diameter of 20 to 30 $\mu$m are connected with each other, and its surface is rough microscopically. For this reason, the surface is polished so that the transmittance can be heightened. However, since such polishing work is done on a curved surface and the arc tube is small, this is a troublesome step.

SUMMARY OF THE INVENTION

The present invention is devised in order to solve the above problem, and its object is to provide a corrosion-resistant alumina member which has excellent corrosion resistance and pressure resistance, namely, strength, and to provide arc tubes for high intensity discharge lamps made of satisfactory polycrystalline alumina which have high corrosion resistance and high strength and in which light transmittance is excellent without executing a polishing step such as mechanical polishing or chemical polishing.

In order to solve the above problems, a corrosion-resistant alumina member in accordance with the invention comprises polycrystalline alumina, wherein an average crystal grain diameter of a surface is two to ten times as large as an average crystal grain diameter of a portion including a center line of a thickness.

When such a difference in grain diameter is given between the surface and the inside, the grain diameter of the surface as an exposed portion is large so that the corrosion resistance is improved. Meanwhile, since the grain diameter of the inside is small and is maintained in a state at the time of calcining, the strength is not deteriorated.

The alumina member in accordance with the invention has a transmittance in the thickness of 1 mm of not less than 85%. As a result, a lowest light transmitting property is secured, and the invention can be used as a window member or a container for equipment requiring corrosion resistance and high strength.

Further, arc tubes for high intensity discharge lamps in accordance with the invention comprise the corrosion-resistant alumina member of which transmittance in the thickness of 1 mm is not less than 85%. In the arc tubes for high intensity discharge lamps in accordance with the invention, an average crystal grain diameter of a portion including a centerline of a thickness is 10 $\mu$m to 100 $\mu$m. According to this structure, the invention can be used as arc tubes without executing mechanical polishing or chemical polishing.

In addition, in the arc tube for a high intensity discharge lamp in accordance with the invention, the thickness of the corrosion-resistant alumina member is 0.1 mm to 7 mm. When the thickness is controlled between theses values, the arc tube in which the total transmittance is not less than 98% and the In-line transmittance is not less than 5% can be obtained. As a result, the satisfactory arc tube can be formed without executing mechanical polishing or chemical polishing which was conventionally executed in an arc tube made of polycrystalline alumina in order to improve transmittance.

DETAILED DESCRIPTION OF THE INVENTION

There will be detailed and explained below the concrete embodiment of the present invention with reference to the drawings.

Figure 1:
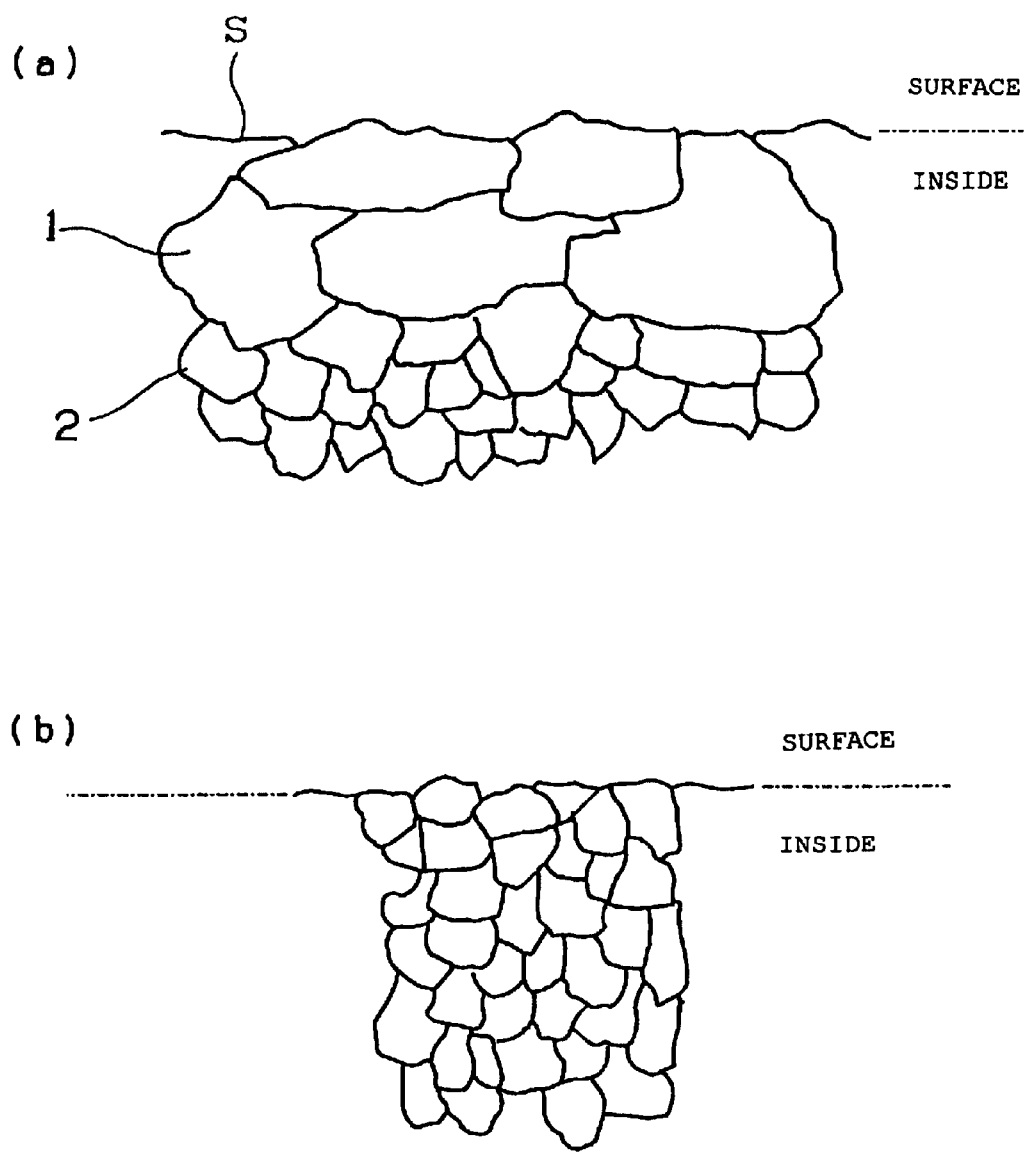
FIG. 1(a) is a model diagram showing a cross section of a surface layer of an arc tube for a high intensity discharge lamp according to the present invention.
FIG. 1(b) is a model diagram of a cross section of the surface layer of the arc tube which is not subject to heat treatment.

FIG. 1(a) shows a sectional model of an arc tube for a high intensity discharge lamp of the present invention, and in the drawing, S is a surface of an alumina member, downward is an inside direction, 1 is surface portion alumina crystal grains, and 2 is internal portion alumina crystal grains. An average crystal grain diameter of the alumina of the surface portion is two to ten times as large as an average crystal grain diameter of the internal portion alumina crystal grains.

The alumina grains of the surface whose average crystal grain diameter is two to ten times as large as the internal alumina grains may occupy about 1 to 10% of a thickness of the member although this percentage depends on the thickness. Moreover, FIG. 1(b) shows a sectional view of a conventional polycrystalline alumina member which is not subject to heat treatment.

In such a manner, when the alumina average crystal grain diameter on the surface of the alumina member is set to be two to ten times as large as the average crystal grain diameter of the internal alumina grains, namely, the alumina average crystal grain diameter of the surface is set to be larger, the alumina member has excellent corrosion resistance. Moreover, since the average crystal grain diameter of the internal alumina is maintained small, the strength is not deteriorated.

For this reason, when the polycrystalline alumina which has been hardly realized conventionally is used, a member which has excellent corrosion resistance and pressure resistance, namely, excellent strength can be obtained. A high corrosion-resistant and high strength member composed of the alumina member can be used for, for example, a portion which requires chemical resistance, particularly a container such as a pump which requires acid resistance. As a result, this member can provide a pump having durability. Further, when total transmittance in a thickness of 1 mm is set to 85% or more, this member can be used as a window member which requires corrosion resistance and high strength without carrying out mechanical polishing, chemical polishing or the like. For example, this member can be used for a port hole of a high-temperature reactor, or suitably used for a plasma gas generation-use gas pass tube requiring corrosion resistance and a light transmitting property particularly in a plasma treatment apparatus which is required in a technique for making a semiconductor pattern minute so that plasma can be generated satisfactorily. As a result, this member can be used as a window member for observing an inclement environment.

In addition, the alumina member can be used for an arc tube for a high intensity discharge lamp. In this case, since the corrosion resistance and pressure resistance are excellent and also the grain diameter of the surface is large, scattering of light can be suppressed. In particular, when the average crystal grain diameter on the inside including a center line of the thickness is set within a range of 10 μm to 100 μm and the thickness is controlled between 0.1 mm to 7 mm, an arc tube in which the whole ray transmittance is not less than 98% and the linear ray transmittance is not less than 5% can be obtained. As a result, the satisfactory arc tube can be formed without executing mechanical polishing or chemical polishing which were conventionally executed in an arc tube made of polycrystalline alumina in order to improve transmittance.

When the alumina grain diameter of the surface is decreased to half of the grain diameter in the inside, since the alumina grain diameter of the surface is too small, desirable corrosion resistance cannot be obtained. When the alumina grain diameter of the surface is increased to be ten times as large as the grain diameter of the inside, a crack is easily generated in a layer with a size of a grain. Therefore, these two cases are not preferable. Moreover, in the arc tube for a high intensity discharge lamp, not only corrosion resistance and pressure resistance but also transmittance is required. However, since thermal stress is applied due to repetition, a crack is easily generated on an interface between the layer of the large average crystal grain diameter and the layer of the small average crystal grain diameter.

For this reason, it is preferable that a ratio of the alumina average crystal grain diameter of the surface to the average crystal grain diameter of the inside is 2 to 8:1, and it is more preferable the ratio is 3 to 5:1 for increasing reliability.

In addition, as for a luminous container of the present invention, when an average grain diameter of the surface including the center line of the thickness becomes smaller than 10 μm, since the alumina average crystal grain diameter on the surface becomes too small, this is not preferable when this luminous container is used as an arc tube because the light transmitting property is lowered. Moreover, when the alumina average crystal grain diameter of the surface becomes larger than 100 μm, the average crystal grain diameter of the inside is too large, this is not preferable because strength is lowered. Therefore, it is preferable that the average grain diameter of the inside is 10 μm to 100 μm, but 15 μm to 60 μm is more preferable, and further 20 μm to 30 μm is more preferable.

In addition, it is preferable that the thickness of the luminous container of the present invention is 0.1 mm to 7 mm. When the thickness becomes smaller than 0.1 mm, there arises a problem from the viewpoint of the mechanical strength, and when the thickness becomes larger than 7 mm, this is not preferable from the viewpoint of the light transmitting property. Here, it is more preferable that the thickness is 0.3 mm to 5 mm.

There will be explained below one example of a method of manufacturing the above arc tube for a high intensity discharge lamp with reference to the flow chart of FIG. 2. At first alumina powder is prepared as a starting material at step 1 (S1). The alumina powder having purity of not less than 99.99% and an average grain diameter of 0.6 μm is prepared by adding magnesia as assistant, and binder such as methyl cellulose or polyethylene oxide as well as water is added, and they are mixed (S2). After the mixing, clay is regulated so that body is obtained (S3). Thereafter, the body is extruded so that a compact is formed (S4). Here, the compact can be obtained also by powder pressing, and in this case, granulation is carried out after the mixing (S5) so that the powder pressing is executed at S6. Moreover, the assistant is not limited to magnesia, and suitable selection is possible.

The compact obtained in such a manner is left in air and provisionally calcined at 1200° C. (S7), and as shown in a temperature profile of FIG. 2, the compact is calcined at 1850° C. for three hours in an atmosphere of hydrogen with a gas flow rate of 5 1/min (S8). Finally, the compact is subject to heat treatment such that it is heated at 1800° C. for 2 hours in a vacuum with air pressure of about $5 \times 10^{-5}$ torr at S9.

With this formation, the arc tube in which the average crystal grain diameter of the surface is two to ten times as large as the average crystal grain diameter of the inside can be obtained.

Figure 2:
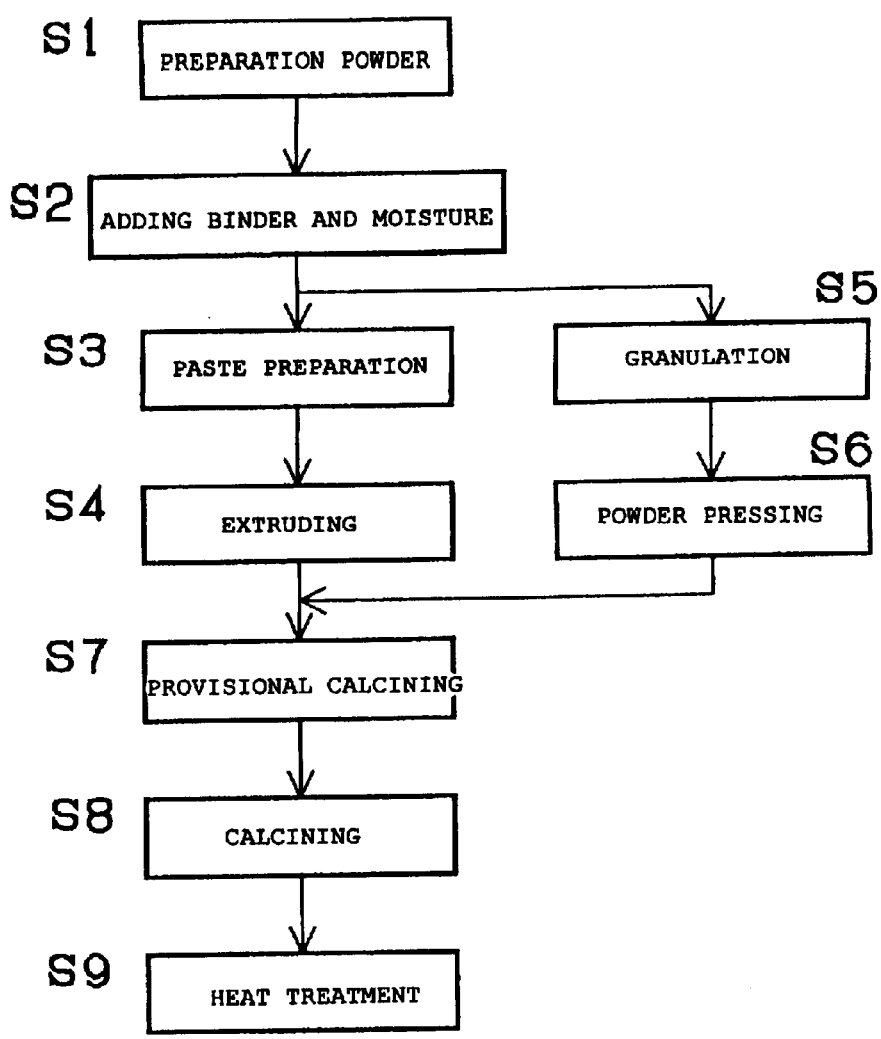
FIG. 2 is a flow chart showing a method of manufacturing the arc tube for a high intensity discharge lamp having a section property of FIG. 1(a)
Figure 3:
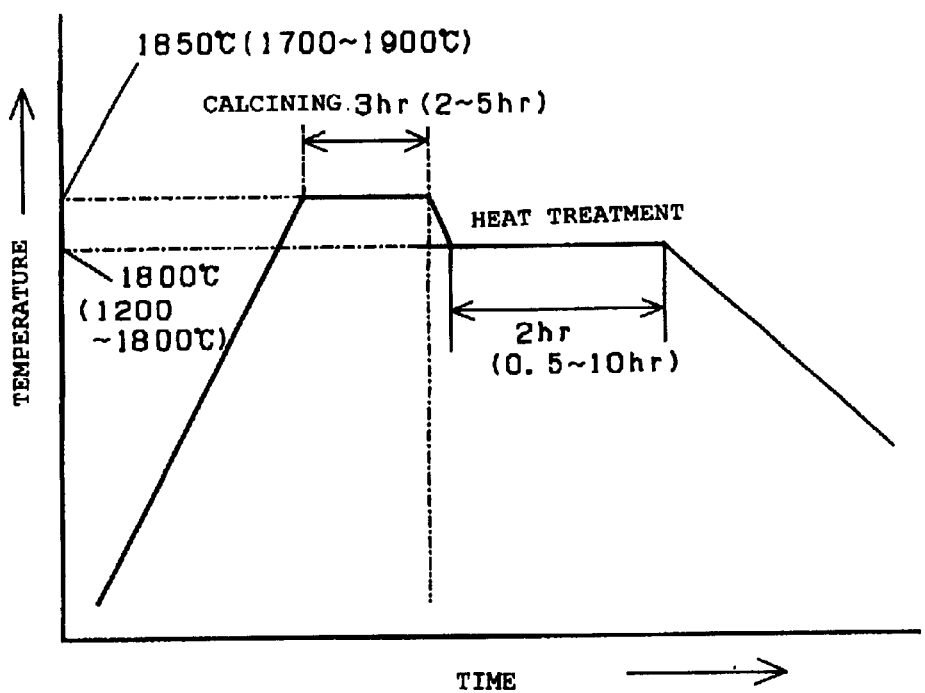
FIG. 3 is a temperature profile of calcining and heating steps in FIG. 2.

As shown in FIG. 2, the heat treatment may be carried out directly after the calcining, but it may be the step independent from the calcining, namely, the heat treatment may be carried out in such a manner that the temperature temporarily drops after the calcining and the temperature is again raised. Moreover, the calcining temperature profile is changed according to a target grain diameter characteristic. The calcining may be carried out at 1700 to 1900° C. for 2 to 5 hours, and the heat treatment may be carried out at 1200 to 1800° C. for 0.5 to 10 hours. The gas flow rate in the atmosphere of hydrogen may be 1.5 1/min to 6 1/min, and a degree of vacuum in the vacuum atmosphere may be $10 \times 10^{-4}$ torr to $10 \times 10^{-3}$ torr.

As detailed above, since the corrosion-resistant alumina member of the present invention has high corrosion resistance and high strength, it can be used as a member having excellent chemical resistance and pressure resistance and also as a window member for observing an inclement environment. Moreover, the arc tube for a high intensity discharge lamp of the present invention has high corrosion resistance and high strength, and satisfactory transmittance is obtained without going through the polishing step such as mechanical polishing or chemical polishing.

What is claimed is:

1. A corrosion-resistant alumina member comprising polycrystalline alumina, wherein an average crystal grain diameter of surface grains is two to ten times as large as an average crystal grain diameter of internal grains located at a center line of a thickness dimension of said alumina member when viewed in cross-section.

2. The corrosion-resistant alumina member according to claim 1, wherein said alumina member has a total transmittance value of not less than 85% per 1 mm of thickness.

3. An arc tube for a high intensity discharge lamp comprising the corrosion-resistant alumina member according to claim 2.

4. The arc tube for a high intensity discharge lamp according to claim 3, wherein said average crystal grain diameter of said internal grains is 10 $\mu$m to 100 $\mu$m.

5. The arc tube for a high intensity discharge lamp according to claim 3, wherein said thickness of said alumina member is 0.1 mm to 7 mm.

* * * * *